(12) United States Patent
Kim et al.

(10) Patent No.: US 8,630,184 B2
(45) Date of Patent: Jan. 14, 2014

(54) UPLINK CONTROL CHANNEL FORMAT

(75) Inventors: Byoung-Hoon Kim, Seoul (KR); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1159 days.

(21) Appl. No.: 12/191,577

(22) Filed: Aug. 14, 2008

(65) Prior Publication Data

US 2009/0046805 A1    Feb. 19, 2009

Related U.S. Application Data

(60) Provisional application No. 60/964,962, filed on Aug. 15, 2007.

(51) Int. Cl.
*H04W 24/10* (2009.01)

(52) U.S. Cl.
USPC ........... 370/236; 370/328; 370/332; 370/349; 455/69; 455/422.1; 375/358

(58) Field of Classification Search
USPC ........ 370/236, 236.1, 236.2, 310.2, 328–339, 370/349; 455/68, 69, 126, 422.1, 513; 375/358
See application file for complete search history.

(56) References Cited

U.S. PATENT DOCUMENTS

| | | | |
|---|---|---|---|
| 7,197,281 B2 | 3/2007 | Pietraski et al. | |
| 2007/0011550 A1 | 1/2007 | Agrawal et al. | |
| 2007/0160156 A1* | 7/2007 | Melzer et al. | 375/260 |
| 2007/0217540 A1 | 9/2007 | Onggosanusi et al. | |
| 2008/0232449 A1* | 9/2008 | Khan et al. | 375/220 |
| 2008/0298482 A1* | 12/2008 | Rensburg et al. | 375/260 |
| 2009/0046805 A1* | 2/2009 | Kim et al. | 375/295 |
| 2009/0059844 A1* | 3/2009 | Ko et al. | 370/328 |
| 2010/0046460 A1* | 2/2010 | Kwak et al. | 370/329 |
| 2010/0067461 A1* | 3/2010 | Kwak et al. | 370/329 |
| 2010/0067616 A1* | 3/2010 | Chun et al. | 375/295 |
| 2010/0135273 A1* | 6/2010 | Kim | 370/344 |
| 2010/0173639 A1* | 7/2010 | Li et al. | 455/450 |
| 2010/0183086 A1* | 7/2010 | Ko et al. | 375/260 |
| 2011/0211510 A1* | 9/2011 | Kim et al. | 370/311 |

FOREIGN PATENT DOCUMENTS

| | | |
|---|---|---|
| EP | 1770889 A2 | 4/2007 |
| RU | 2145775 | 2/2000 |
| RU | 2198467 C2 | 2/2003 |
| WO | WO9507578 | 3/1995 |
| WO | WO0062435 A1 | 10/2000 |
| WO | WO2006138622 | 12/2006 |
| WO | WO2008137430 A1 | 11/2008 |

OTHER PUBLICATIONS

International Search Report and Written Opinion—PCT/US2008/073367—ISAEPO—Jan. 21, 2009.
Samsung: "Uplink data-non-associated control signaling", 3GPP TSG RAN WG1 Meeting #48bis R1-071573, Mar. 26, 2007, pp. 1-4.
Taiwan Search Report—TW097131372—TIPO—Sep. 26, 2012.

\* cited by examiner

*Primary Examiner* — Hoon J Chung
(74) *Attorney, Agent, or Firm* — Dalei Dong

(57) ABSTRACT

Systems and methodologies are described that facilitate encoding feedback or control information into a compact payload. In particular, a rank indicator, a precoding matrix indicator and channel quality indicators are packaged into a control channel payload that fits into a single sub-frame. The payload format is determined based at least in part on an antenna configuration or channel quality indicator granularity. In addition, hybrid automatic repeat requests can be included in the payload.

39 Claims, 11 Drawing Sheets

UPLINK CONTROL CHANNEL FORMAT

CROSS-REFERENCE TO RELATED APPLICATIONS

This application claims the benefit of U.S. Provisional Patent application Ser. No. 60/964,962 entitled "UPLINK CONTROL CHANNEL FORMAT FOR LTE" which was filed Aug. 15, 2007. The entirety of the aforementioned application is herein incorporated by reference.

BACKGROUND

I. Field

The following description relates generally to wireless communications, and more particularly to uplink control channel formats in wireless communication networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates reporting information on a control channel is provided. The method can comprise encoding at least a rank indicator, a precoding matrix indicator and channel quality indicators in a control channel payload in accordance with a payload format, the format includes a bit sequence that encodes at least the rank indicator jointly with a plurality of channel quality indicator levels. In addition, the method can include transmitting the encoded payload on an uplink control channel.

Another aspect relates to a wireless communications apparatus. The wireless communications apparatus can include a memory that retains instructions related to encoding at least a rank indicator, a precoding matrix indicator and channel quality indicators in a control channel payload in accordance with a payload format, the format includes a bit sequence that encodes at least the rank indicator jointly with a plurality of channel quality indicator levels and transmitting the encoded payload on an uplink control channel. In addition, the wireless communications apparatus can also include a processor, coupled to the memory, configured to execute the instructions retained in the memory.

Yet another aspect relates to a wireless communications apparatus that facilitates reporting information on a control channel. The wireless communications apparatus can comprise means for encoding at least a rank indicator, a precoding matrix indicator and channel quality indicators in a control channel payload in accordance with a payload format, the format includes a bit sequence that encodes at least the rank indicator jointly with a plurality of channel quality indicator levels. In addition, the wireless communications apparatus can include means for transmitting the encoded payload on an uplink control channel.

Still another aspect relates to a computer program product. The computer program product can have a computer-readable medium that includes code for causing at least one computer to encode at least a rank indicator, a precoding matrix indicator and channel quality indicators in a control channel payload in accordance with a payload format, the format includes a bit sequence that encodes at least the rank indicator jointly with a plurality of channel quality indicator levels. The computer-readable medium can also comprise code for causing at least one computer to transmit the encoded payload on an uplink control channel.

Still yet another aspect relates to an apparatus in a wireless communications system. The apparatus can comprise a processor configured to encode at least a rank indicator, a precoding matrix indicator and channel quality indicators in a control channel payload in accordance with a payload format, the format includes a bit sequence that encodes at least the rank indicator jointly with a plurality of channel quality indicator levels. The processor can further be configured to transmit the encoded payload on an uplink control channel.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
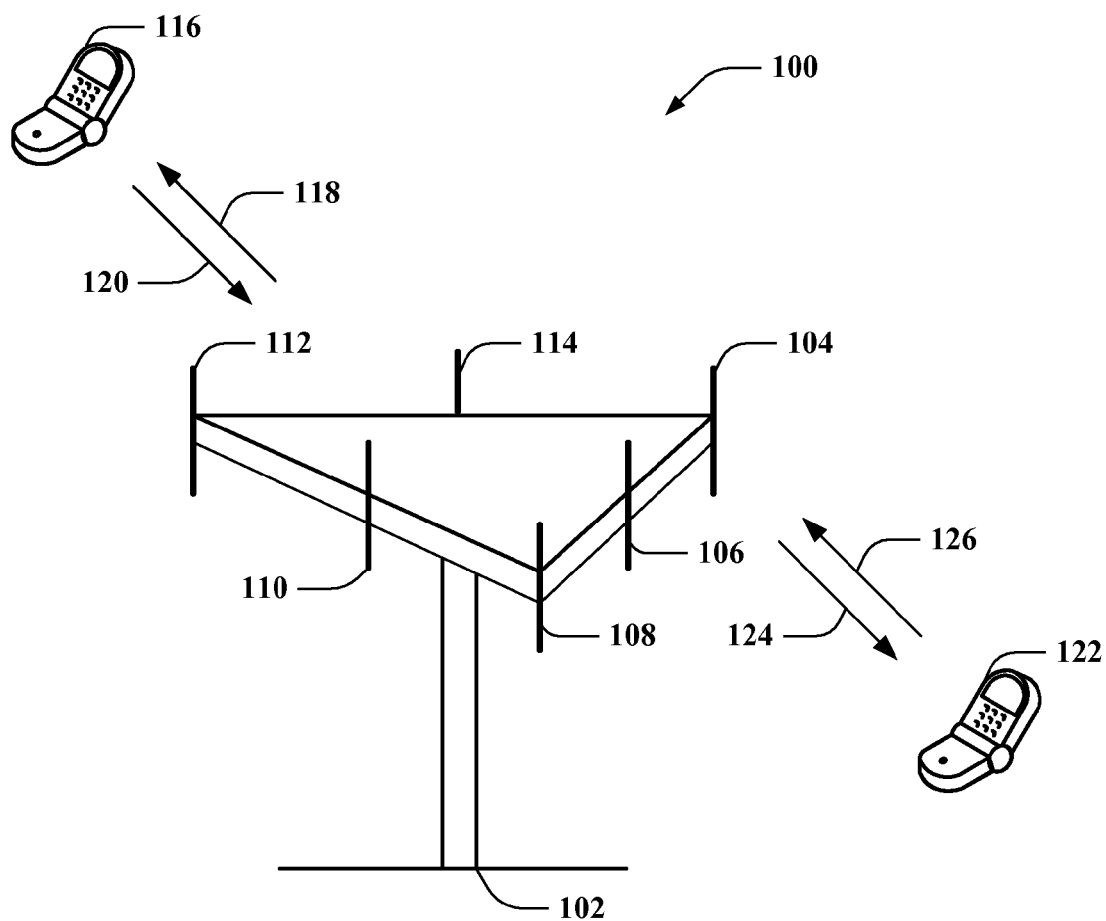
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDM2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like.

Figure 2:
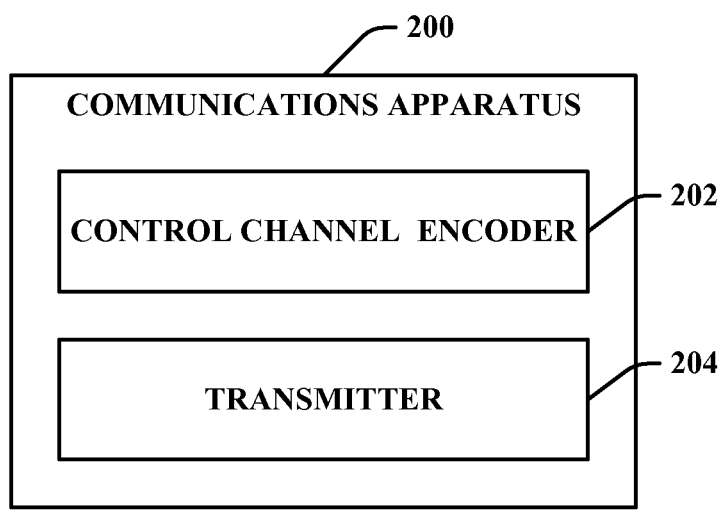
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. For example, the communications apparatus 200 can be an access terminal (e.g., a mobile device, user equipment, etc.) that transmits control information and/or reports to an access point (e.g., a base station, NodeB, evolved NodeB (eNodeB), etc.). The communications apparatus 200 can include a control channel encoder 202 that can encode a payload that includes feedback information in accordance with a payload format and/or bit fields, and transmitter 204 that can transmit the encoded payload on a control channel.

Pursuant to an example, the communications apparatus 200 can feedback information to another apparatus in a wireless communications system and/or network. For instance, the communications apparatus 200 can report a rank indicator (RI), a precoding matrix indicator (PMI), a channel quality indicator (CQI) and the like. In addition, the communications apparatus 200 can also provide hybrid automatic repeat request (HARQ) indicator such as acknowledgements (ACK) and non-acknowledgments (NACK). The reported feedback information can facilitate efficient downlink transmission and, in particular, downlink multiple-input, multiple-output (MIMO) transmission. Pursuant to an illustration, an uplink control channel can be employed to deliver the feedback information payload. For instance, a physical uplink control channel (PUCCH) in Long Term Evolution (LTE) based systems can be utilized. However, it is to be appreciated that other channels can be employed with aspects described herein.

The control channel encoder 202 can encode the feedback information into a sub-frame. For example, the control channel encoder 202 can generate a sub-frame payload that includes at least a RI, a PMI, a CQI and optionally a HARQ decoding indicator. Bit widths required by the communications apparatus 200 to report RI and PMI for each subband vary according to antenna configuration (e.g., number of transmit antennas and number of receive antennas). Pursuant to an illustration, the RI requires one bit (e.g., to identify rank 1 or rank 2) in 2×2 or 4×2 antenna configurations and two bits (e.g., to identify ranks 1 through 4) in a 4×4 antenna configuration. The PMI is employed to identify which entry in a precoding codebook should be utilized for precoding based beamforming. Accordingly, the bit width is dependent on codebook size. For example, in LTE systems, the precoding codebook includes three precoders for rank-2 and six precoders for rank-1 in a 2×2 antenna configuration. Thus, two bits are required for to identify a precoder for rank 2 and three bits are needed for rank-1. For 4×2 or 4×4 antenna configurations, the codebook includes 16 precoders per rank (e.g., 16 precoders for each of ranks 1 through 4). Accordingly, four bits are needed to identify a precoder in 4×2 and 4×4 antenna configurations.

A channel quality indicator (CQI) is also reported. The CQI can indicate one of 32 quality levels per codeword.

Accordingly, the number of bits required to report a CQI is typically five bits per codeword when the CQI describes a signal to interference over noise ratio (SINR) range from approximately −5 dB to 25 dB with a 1 dB granularity. In LTE systems, 2 codewords can be employed. Thus, a required bit width to report CQI is ten bits. In order to report RI, PMI and CQI, the control channel encoder 202 encodes the information into a total of 13-14 bits for 2×2, 15 bits for 4×2 and 16 bits for 4×4. It is to be appreciated that separately reporting the rank indicator can reduce burden of PMI/CQI reporting by 1 or 2 bits. However, a separate RI report requires an additional control channel with lower error rate requirements.

A reduced CQI feedback can be available for at least large delay cyclic delay diversity (CDD) precoding. However, it is to be appreciated that reduced CQI can be utilized with zero-delay and small delay CDD precoding. The reduced CQI feedback can be realized by utilizing a spatially differential CQI format (e.g., a full CQI in addition to a delta CQI) between two codewords that exploit similarity of effective SINR of the codewords in large delay CDD precoding absent any potential, non-negative successive interference cancellation gains.

A control channel that employs Zadoff-Chu (ZC) spreading can generate 20 coded bits in a single sub-frame with one resource block allocation. Pursuant to another example a discrete Fourier transform (DFT) based control channel generates 48 coded bits in one sub-frame with one resource block allocation. Accordingly, the control channel encoder 202 can efficiently pack the feedback or control information (e.g., RI, PMI, CQI, ACK/NACK) into a limited time-frequency resource block allocated to control channels (e.g., 20 bits for ZC spreading based control channels and 48 bits for DFT based control channels). In addition, the control channel encoder 202 can leverage a reduced CQI format to further condense the bit width of the control information.

In a single-input, multiple output (SIMO) system, RI and PMI information is not present. Accordingly, only CQI information is reported. The bit width of a CQI-only payload depends on CQI granularity. For example, the payload is five bits in length with a CQI granularity of 1 dB. The five bits can encode 32 levels of full CQI of the SIMO system. As described infra, additional bit width reduction can be realized through alterations in CQI granularity.

The five bit payload can fit within ZC spreading based control channel leading to (20, 5) code. In accordance with another aspect, a DFT based control channel can be employed which results in (48, 5) code. In addition, ACK/NACK can be transmitted together with CQI in the control channel. Accordingly, the control channel encoder 202 can utilize an additional bit for an ACK or NACK indication leading to (20 6) code for ZC spreading based channel or (48, 6) code for DFT based channel. Moreover, a (10, 6) block coding can be employed to facilitate sending the payload in ZC spreading based control channels.

In a multiple-input, multiple-output (MIMO) system with a 2×2 or 2×4 antenna configurations, a rank indicator, precoding matrix indicator and channel quality indicator are reported. In a MIMO system with an antenna configuration that includes two transmit antennas, the control channel payload that includes RI, PMI and CQI can be encoded in 10 bits. This results in (20, 10) code for ZC spreading based channels and (48, 10) code for DFT based channels. Moreover, if a HARQ indicator (e.g., ACK or NACK) is to be included in the control channel payload, at most two additional bits are required. Accordingly, the inclusion of ACK/NACK indicators results in (20, 12) code for ZC spreading based channels and (48, 12) in DFT based channels. With HARQ indicators, a ZC spreading based channels requires at least two slots of a sub-frame to accommodate the payload while a DFT based channel can fit the payload within a single slot.

In a MIMO system with a 4×2 configuration, the control channel encoder 202 can encode RI, PMI and CQI in a 12-bit payload. The payload size can increase to 14 bits if an ACK or NACK indicator is included. Accordingly, in a ZC spreading based control channel, the control channel encoder 202 generates (20, 12) code or (20, 14) code depending on the inclusion of a HARQ indicator. Further, the control channel encoder 202 provides (48, 12) code or (48, 14) code.

Pursuant to another aspect, in a MIMO system with a 4×4 configuration, the control channel encoder 202 can encode RI, PMI and CQI in a 14-bit payload. The payload size can increase to 16 bits if an ACK or NACK indicator is included. Accordingly, in a ZC spreading based control channel, the control channel encoder 202 generates (20, 14) code or (20, 16) code depending on the inclusion of a HARQ indicator. Further, the control channel encoder 202 provides (48, 14) code or (48, 16) code.

Moreover, although not shown, it is to be appreciated that communications apparatus 200 can include memory that retains instructions with respect to determining an antenna configuration, ascertaining a CQI granularity, encoding RI, PMI and CQI into a payload, transmitting the payload, and the like. In addition, the memory can include instructions that implement a token bucket mechanism to enforce rate control. Further, communications apparatus 200 may include a processor that may be utilized in connection with executing instructions (e.g., instructions retained within memory, instructions obtained from a disparate source, . . . ).

Figure 3:
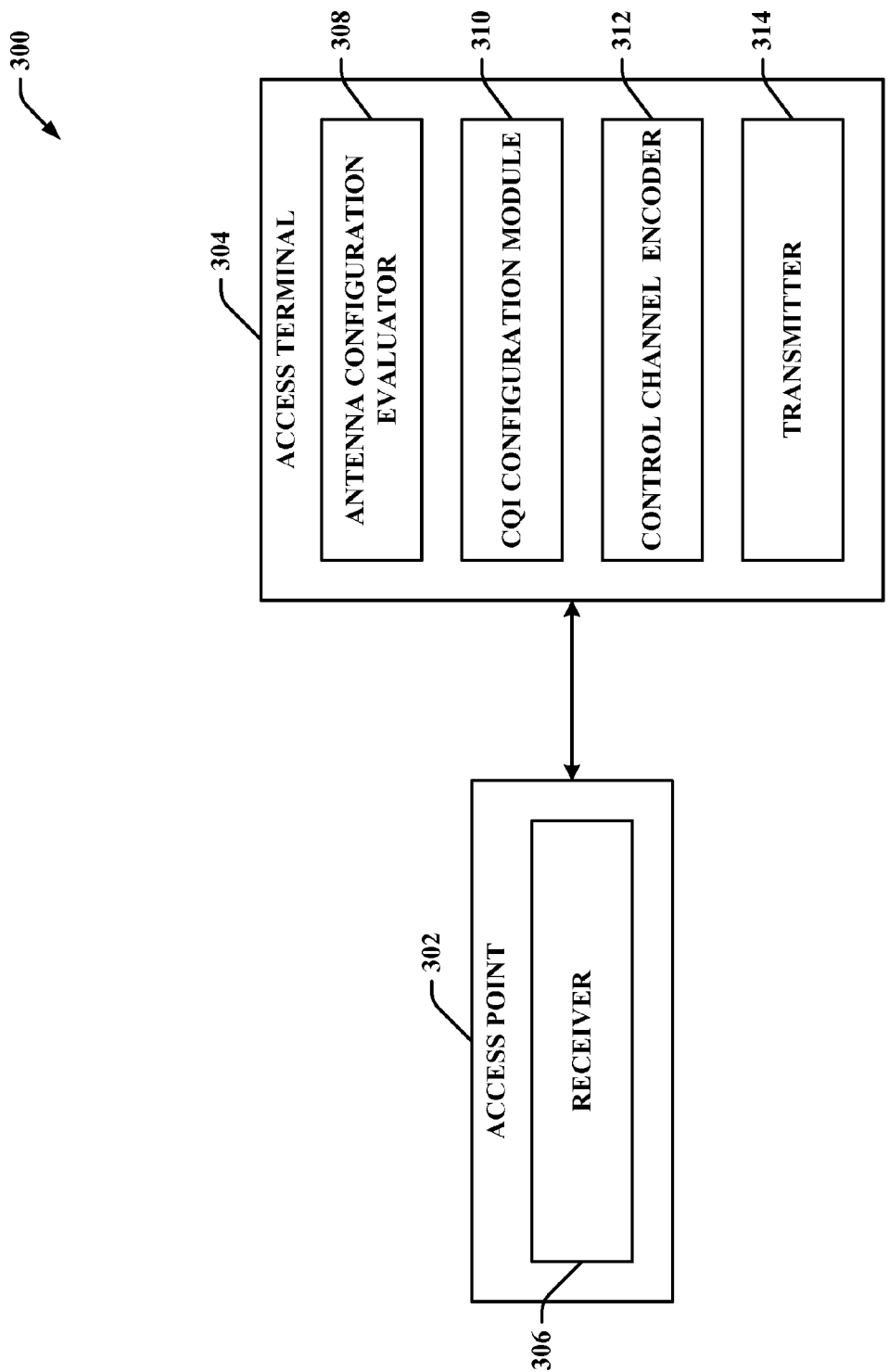
FIG. 3 is an illustration of an example wireless communications system that facilitates employing a control channel format in accordance with an aspect of the subject disclosure.

Now referring to FIG. 3, illustrated is a wireless communications system 300 that can facilitate employing a control channel format in accordance with an aspect of the subject disclosure. The system 300 includes an access point 302 that can communicate with an access terminal 304 (and/or any number of disparate devices (not shown)). The access point 302 can transmit information to the access terminal 304 over a forward link or downlink channel; further access point 302 can receive information from the access terminal 304 over a reverse link or uplink channel. Additionally, the system 300 can operate in an OFDMA wireless network (such as 3GPP, 3GPP2, 3GPP LTE, etc., for example). Also, the components and functionalities shown and described below in the access point 302 can be present in the access terminal 304 and vice versa, in one example.

The access point 302 includes a receiver 306 that obtains uplink transmissions from the access terminal 304. The access terminal 304 can include an antenna evaluator 308 that can determine an antenna configuration employed in the system 300. For example, the antenna configuration can include a SIMO system, a 2×2 MIMO system, a 2×4 MIMO system, a 4×2 MIMO system, a 4×4 MIMO system or the like. It is to be appreciated that additional configuration can be utilizes with aspects of the subject disclosure. For instance, the configuration can include an M×N system where M and N are integers greater than or equal to one. The antenna configuration employed in the system 300 can influence feedback information required to be reported by the access terminal 304. Accordingly, the antenna evaluator 308 determines the configuration to enable the access terminal 304 to encode feedback information.

The access terminal 304 can further include a CQI configuration module 310 that establishes a CQI granularity employed by the system 300. Pursuant to an illustration, the access terminal 304 reports CQI values that describe SINR values within a range from −5 dB to 25 dB. A number of values reported depend upon a CQI granularity. For example, the access terminal 304 reports 32 levels of CQI at a granularity of 1 dB and 16 levels of CQI at a granularity of 2 dB. The CQI-configuration module 310 determines the CQI granularity, which, in turn, influences a number of bits required to report CQI to the access point 302.

According to another aspect, the access terminal can include a control channel encoder 312 that can encode a payload that includes feedback information in accordance with a payload format and/or bit fields. In an illustrative embodiment, the feedback information can include a rank indicator (RI), a precoding matrix indicator (PMI), a channel quality indicator (CQI) and the like. In addition, the feedback information can optionally include a hybrid automatic repeat request (HARQ): indicator such as acknowledgements (ACK) and non-acknowledgments (NACK). The control channel encoder 312 can encode the feedback information payload for an uplink control channel. For example, a physical uplink control channel (PUCCH) in Long Term Evolution (LTE) based systems can be utilized. However, it is to be appreciated that other channels can be employed with aspects described herein. Once encoded by the control channel encoder 312, the access terminal 304 includes a transmitter 314 that can transmit the encoded payload on the uplink control channel.

Figure 4:
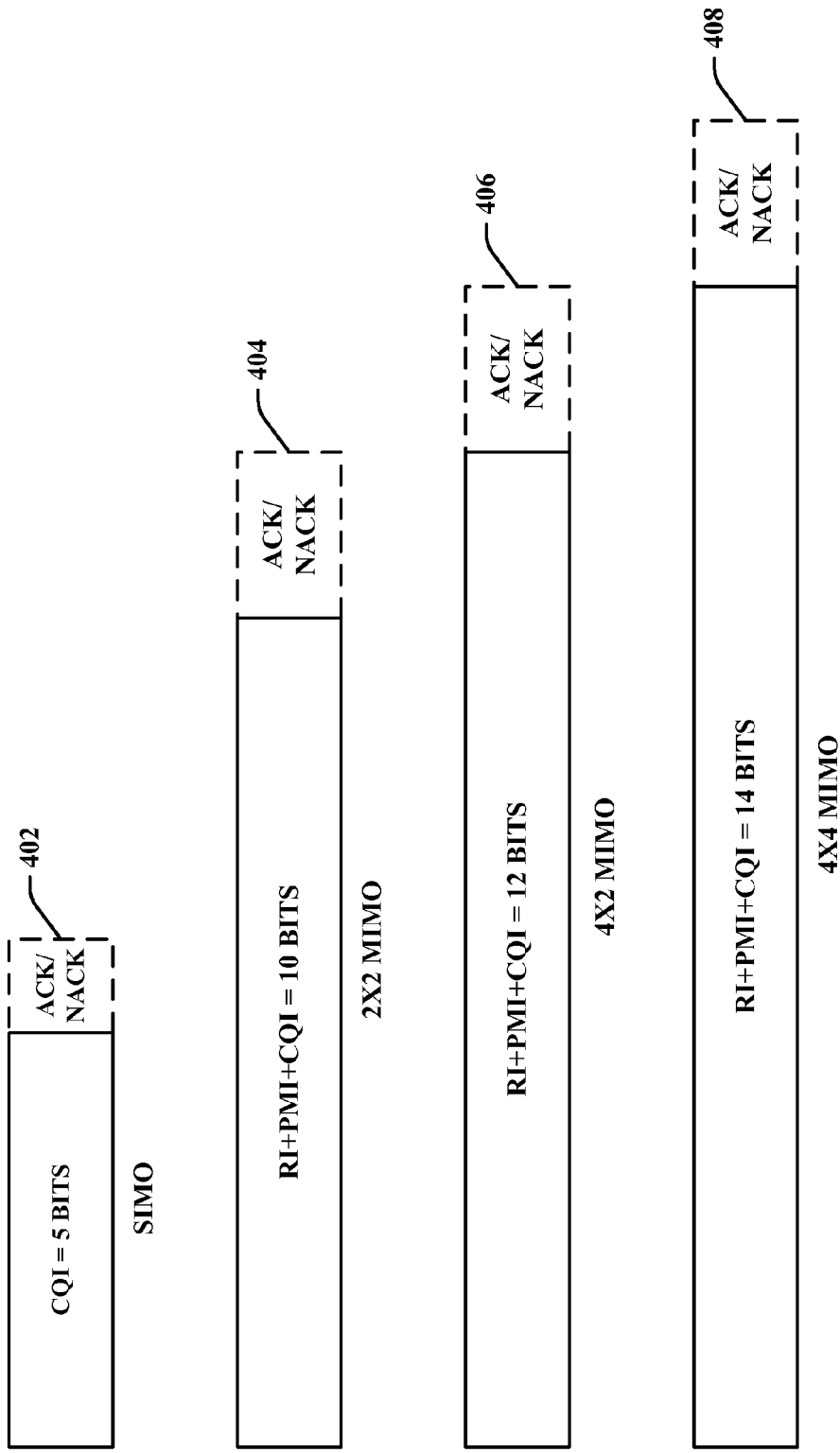
FIG. 4 is an illustration of example payload formats for a control channel.
Figure 5:
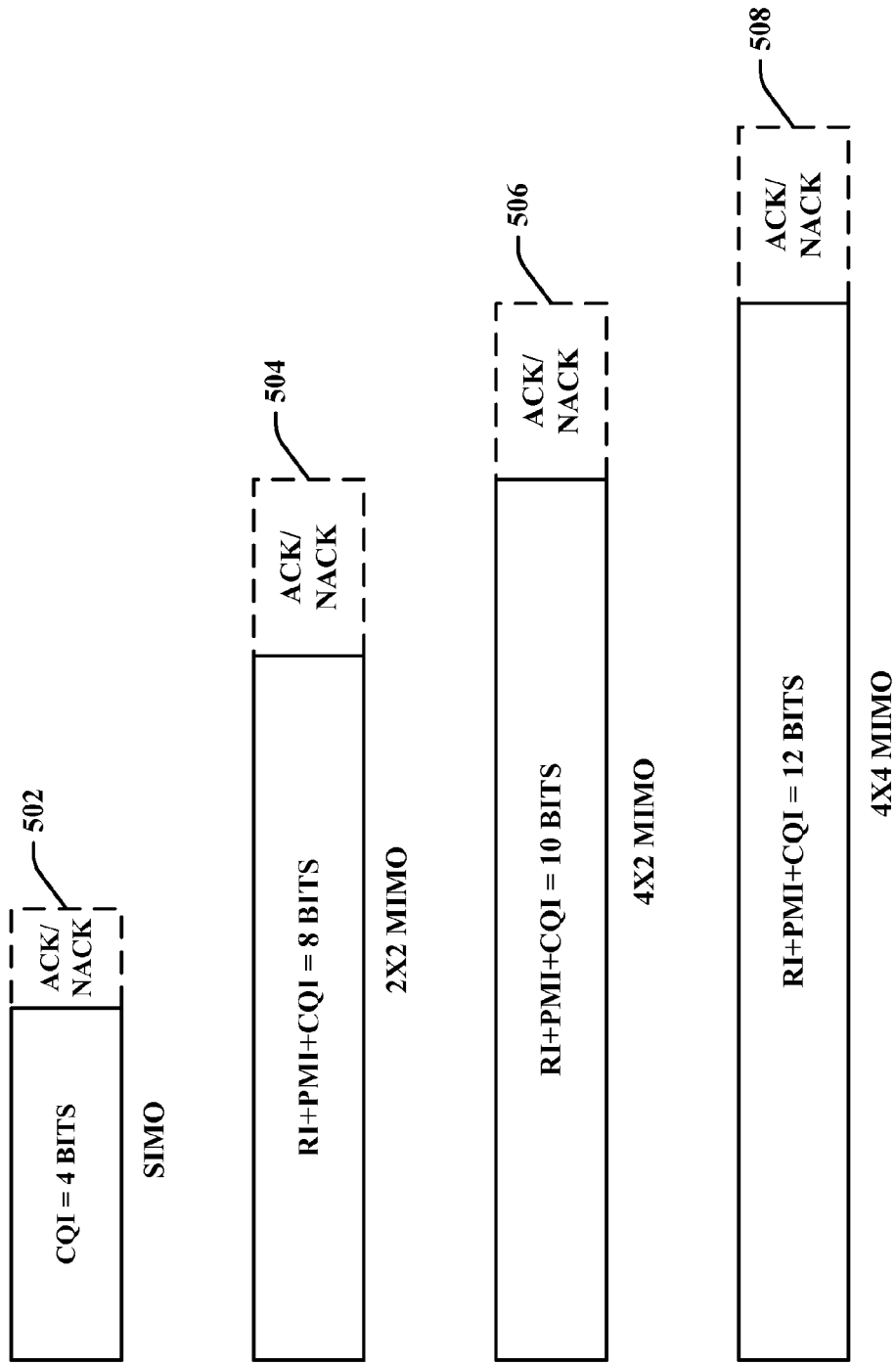
FIG. 5 is an illustration of example payload formats for a control channel.

FIGS. 4 and 5 depict example payload formats for a control channel (e.g., physical uplink control channel). The payloads include feedback information such as a rating indicator, precoding matrix indicator, CQI, etc. According to an aspect, the example formats can be utilized by the control channel encoder 202 or 312 as described with reference to FIG. 2 and FIG. 3, respectively.

Turning now to FIG. 4, depicted are example payload formats for a control channel. Payload formats 402-408 are control channel formats for a variety of antenna configurations with a CQI granularity of 1 dB. Format 402 corresponds to a single-input, multiple-output (SIMO) system and includes a 5-bit payload that encodes 32 levels of full CQI. In addition, format 402 can include an optional additional bit to encode a HARQ indicator (e.g., an ACK or NACK indicator). Format 404 corresponds to a 2×2 multiple-input, multiple-output (MIMO) configuration and includes a 10-bit payload that encodes a rank indicator (RI), a precoding matrix indicator (PMI) and CQI. The 10-bit payload of format 404 includes 5 bits that encode 32 levels of full CQI. In addition, format 404 can include 5 bits that encode 30 hypotheses including RI, PMI and eight levels of delta CQI. Pursuant to an example, six hypotheses are for rank 1 PMI and 24 hypotheses are for rank-2 PMI and delta CQI. Format 404 can optionally include an additional two bits to encode HARQ indicators.

Format 406 corresponds to a 4×2 MIMO antenna configuration and can include a 12-bit payload. The payload includes 5 bits that encode 32 levels of full CQI. Moreover, format 406 can include 3 bits that encode eight hypotheses of RI and seven levels of delta CQI. For example, the 3-bit sequences 000 through 110 can represent seven levels of CQI for rank-2 and the 3-bit sequence 111 can represent rank-1. Further, format 406 can include 4 bits that encode a PMI. The 4 bits for the PMI represent the 16 possible precoding matrices per rank. Format 406 can optionally include an additional two bits to encode HARQ indicators.

Format 408 corresponds to a 4×4 MIMO antenna configuration and can include a 14-bit payload. The payload includes 5 bits that encode 32 levels of full CQI. Moreover, format 408 can include 5 bits that encode 31 hypotheses of RI and 10 levels of delta CQI. For example, the 5-bit sequences 00000 through 11110 can represent 10 levels of CQI for rank-2, rank-3 and rank-4 and the 5-bit sequence 11111 can represent rank-1. Further, format 408 can include 4 bits that encode a PMI. The 4 bits for the PMI represent the 16 possible precoding matrices per rank. Format 408 can optionally include an additional two bits to encode HARQ indicators.

Turning now to FIG. 5, depicted are example payload formats for a control channel. Payload formats 502-508 are control channel formats for a variety of antenna configurations with a CQI granularity of 2 dB. Format 502 corresponds to a single-input, multiple-output (SIMO) system and includes a 4-bit payload that encodes 16 levels of full CQI. In addition, format 502 can include an optional additional bit to encode a HARQ indicator (e.g., an ACK or NACK indicator). Format 504 corresponds to a 2×2 multiple-input, multiple-output (MIMO) configuration and includes an eight-bit payload that encodes a rank indicator (RI), a precoding matrix indicator (PMI) and CQI. The eight-bit payload of format 404 includes four bits that encode 16 levels of full CQI. In addition, format 504 can include 4 bits that encode 15 hypotheses including RI, PMI and three levels of delta CQI. Pursuant to an example, six hypotheses are for rank 1 PMI and nine hypotheses are for rank-2 PMI and delta CQI. Format 404 can optionally include an additional two bits to encode HARQ indicators.

Format 506 corresponds to a 4×2 MIMO antenna configuration and can include a 10-bit payload. The payload includes 4 bits that encode 16 levels of full CQI. Moreover, format 506 can include 32 bits that encode four hypotheses of RI and three levels of delta CQI. For example, the 2-bit sequences 00 through 10 can represent three levels of CQI for rank-2 and the 2-bit sequence 11 can represent rank-1. Further, format 506 can include 4 bits that encode a PMI. The 4 bits for the PMI represent the 16 possible precoding matrices per rank. Format 506 can optionally include an additional two bits to encode HARQ indicators.

Format 508 corresponds to a 4×4 MIMO antenna configuration and can include a 14-bit payload. The payload includes 4 bits that encode 16 levels of full CQI. Moreover, format 508 can include 4 bits that encode 16 hypotheses of RI and 5 levels of delta CQI. For example, the 4-bit sequences 0000 through 1110 can represent 5 levels of CQI for rank-2, rank-3 and rank-4 and the 4-bit sequence 11111 can represent rank-1. Further, format 08 can include 4 bits that encode a PMI. The 4 bits for the PMI represent the 16 possible precoding matrices per rank. Format 508 can optionally include additional two bits to encode HARQ indicators.

Figure 6:
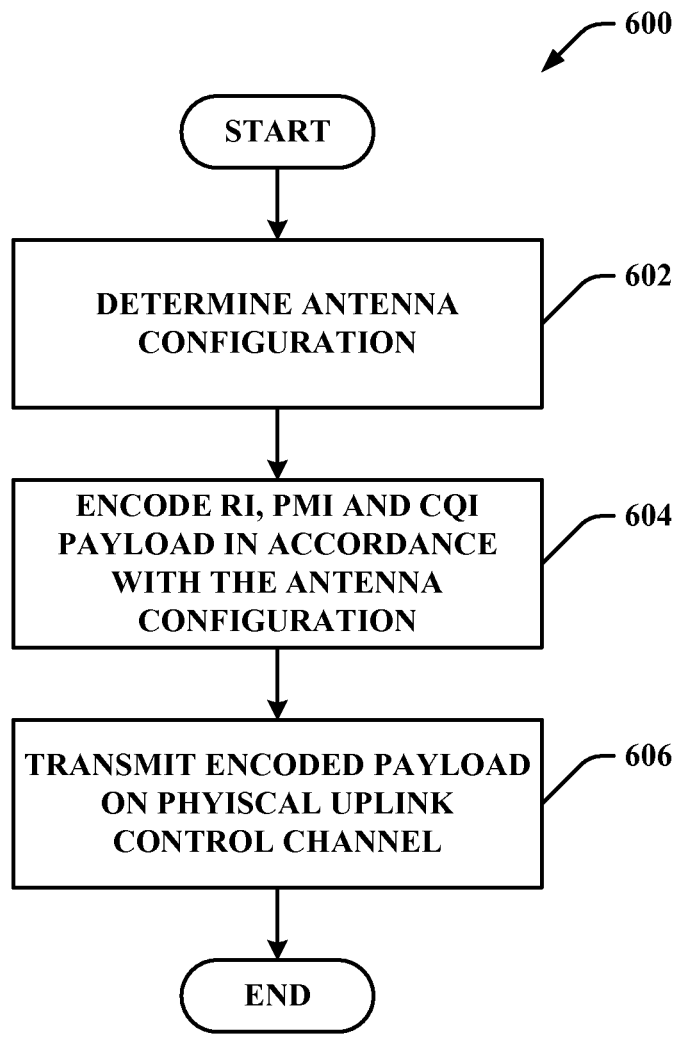
FIG. 6 is an illustration of an example methodology that facilitates encoding feedback information in a control channel in a wireless communications system.
Figure 7:
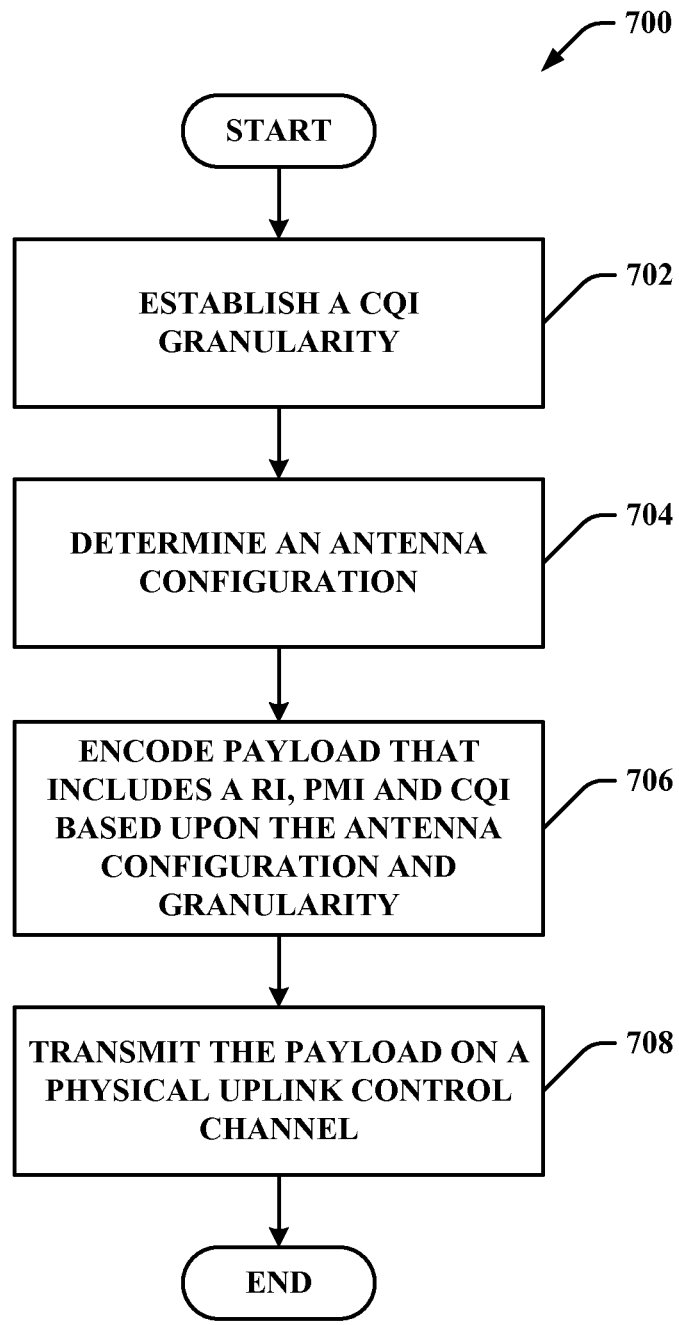
FIG. 7 is an illustration of an example methodology that facilitates encoding feedback information in a control channel in a wireless communications system.

Referring to FIGS. 6-7, methodologies are depicted relating to encoding a rank indicator, a precoding matrix indicator, channel quality indicators and the like within a control channel sub-frame. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates encoding feedback information in a control channel in a wireless communications system. At reference numeral 602, an antenna configuration is determined. The antenna configuration can influence nature and amount of feedback needed to enable efficient downlink transmission. In an example, the antenna configuration can include a single-input, single output (SISO) system, a single-input, multiple-output (SIMO) system, a multiple-input, multiple-output (MIMO) system and the like. In addition, antenna configurations can include a variety of antenna numbers within a system (e.g., a MIMO system). Pursuant to an illustration, a MIMO system can have a M×N configuration wherein M and N can be any integer greater than or equal to one. In an aspect, M represents a number of transmit antennas (e.g., downlink transmit antennas on a base station) and N represents a number of receive antennas (e.g., downlink receive antennas on a mobile device).

At reference numeral 604, a payload for a control channel is encoded in accordance with the determined antenna configuration. The payload can include feedback information such as, but not limited to, a rank indicator, a precoding matrix indicator, channel quality indicators sufficient to provide single to interference plus noise ratios for each rank and the like. In one illustration, the payload is required to fit within a sub-frame of a control channel. A ZC spreading based control channel can generate 20 bits per sub-frame while a DFT based control channel generates 48 bits per sub-frame. Accordingly, the payload can be encoded in accordance with a format as described supra with reference to FIGS. 4 and 5. At reference numeral 606, the payload is transmitted on a control channel. For example, the control channel can be an uplink control channel such as a physical uplink control channel (PUCCH) in LTE systems.

Turning to FIG. 7, illustrated is a methodology 700 that facilitates encoding feedback information in a control channel in a wireless communications system. At reference numeral 702, a CQI granularity can be ascertained. Channel quality indicators relate to a SINR range from approximately −5 dB to 25 dB at particular levels (e.g., increments) or granularities. For example, a granularity of 1 dB with the aforementioned range leads to one of 32 levels reported by a mobile device. A coarser granularity (e.g., higher step size) results in fewer levels and, accordingly, a fewer number of bits required to report CQI. At reference numeral 704, an antenna configuration is determined. The antenna configuration influences number of bits required to report feed back information (e.g., CQI, RI, PMI). For instance, a 4×4 antenna configuration requires at least two bits to report a rank indicator (e.g., rank 1 through 4). In addition, as codebook size changes based upon antenna configuration, bits for a precoding matrix indicator also changes in accordance with an antenna configuration. At reference numeral 706, a payload for a control channel is encoded in accordance with the determined antenna configuration. The payload can include feedback information such as, but not limited to, a rank indicator, a precoding matrix indicator, channel quality indicators sufficient to provide single to interference plus noise ratios for each rank and the like. The payload can be encoded in accordance with a format as described supra with reference to FIGS. 4 and 5. At reference numeral 708, the payload is transmitted on a control channel. For example, the control channel can be an uplink control channel such as a physical uplink control channel (PUCCH) in LTE systems.

It will be appreciated that, in accordance with one or more aspects described herein, inferences can be made regarding ascertaining a CQI granularity, determining an antenna configuration, encoding feedback information, selecting a channel basis (e.g., ZC spreading, DFT, etc.) and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
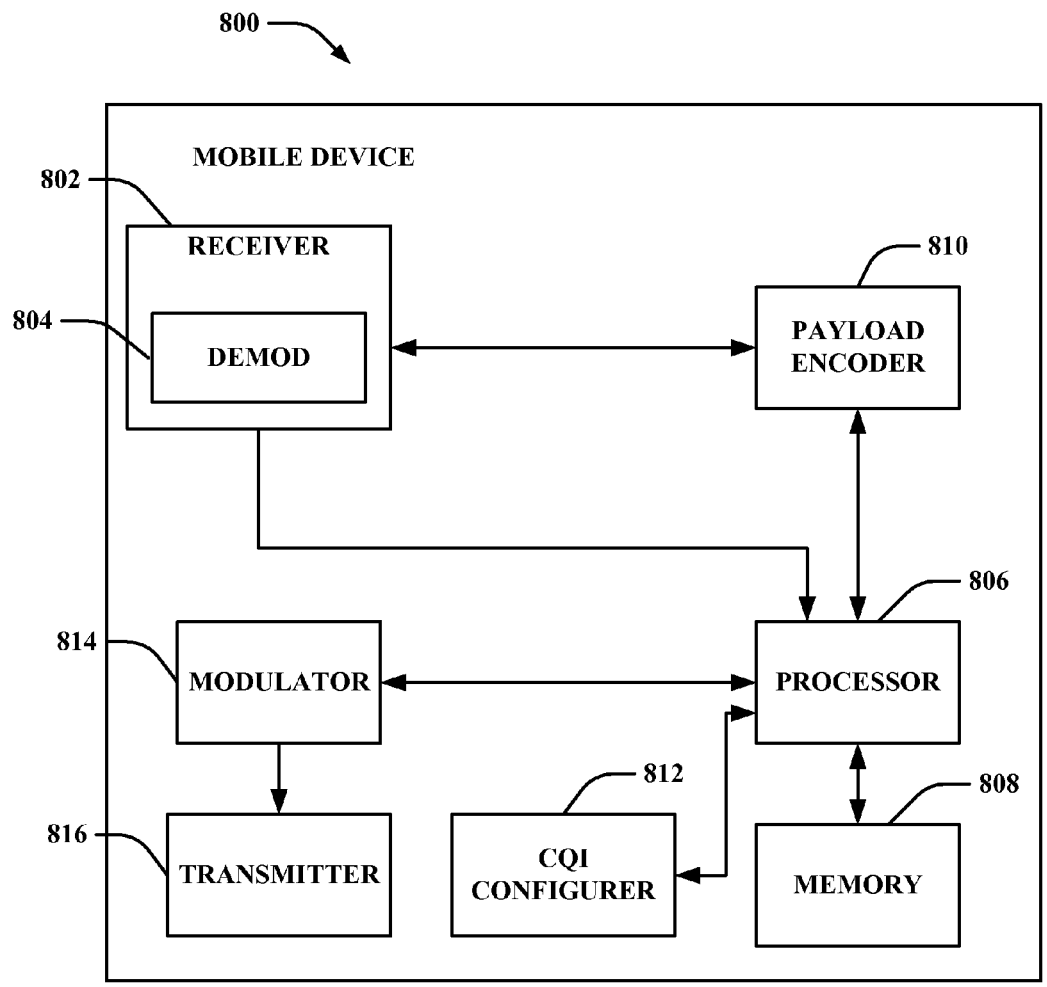
FIG. 8 is an illustration of an example system that facilitates employing an uplink control channel to report feedback and/or control information to at least one base station

FIG. 8 is an illustration of a mobile device 800 that facilitates employing an uplink control channel to report feedback and/or control information to at least one base station. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.). Further, memory 808 can retain prioritized bit rates, maximum bit rates, queue sizes, etc., related to one or more bearers serviced by the mobile device 800.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to a payload encoder 810 that can encode a payload that includes feedback information in accordance with a payload format and/or bit fields. In an illustrative embodiment, the feedback information can include a rank indicator (RI), a precoding matrix indicator (PMI), a channel quality indicator (CQI) and the like. In addition, the feedback information can optionally include a hybrid automatic repeat request (HARQ) indicator such as acknowledgements (ACK) and non-acknowledgments (NACK). The payload encoder 810 can employ one of a plurality of formats to generate the payload, as described supra, for instance.

Processor 806 can further be coupled to a CQI configurer 812 that that establishes a CQI granularity employed in reporting channel quality. Mobile device 800 still further comprises a modulator 814 and transmitter 816 that respectively modulate and transmit signals to, for instance, a base station, another mobile device, etc. Although depicted as being separate from the processor 806, it is to be appreciated that the payload encoder 810, CQI configurer 812, demodulator 804, and/or modulator 814 can be part of the processor 806 or multiple processors (not shown).

Figure 9:
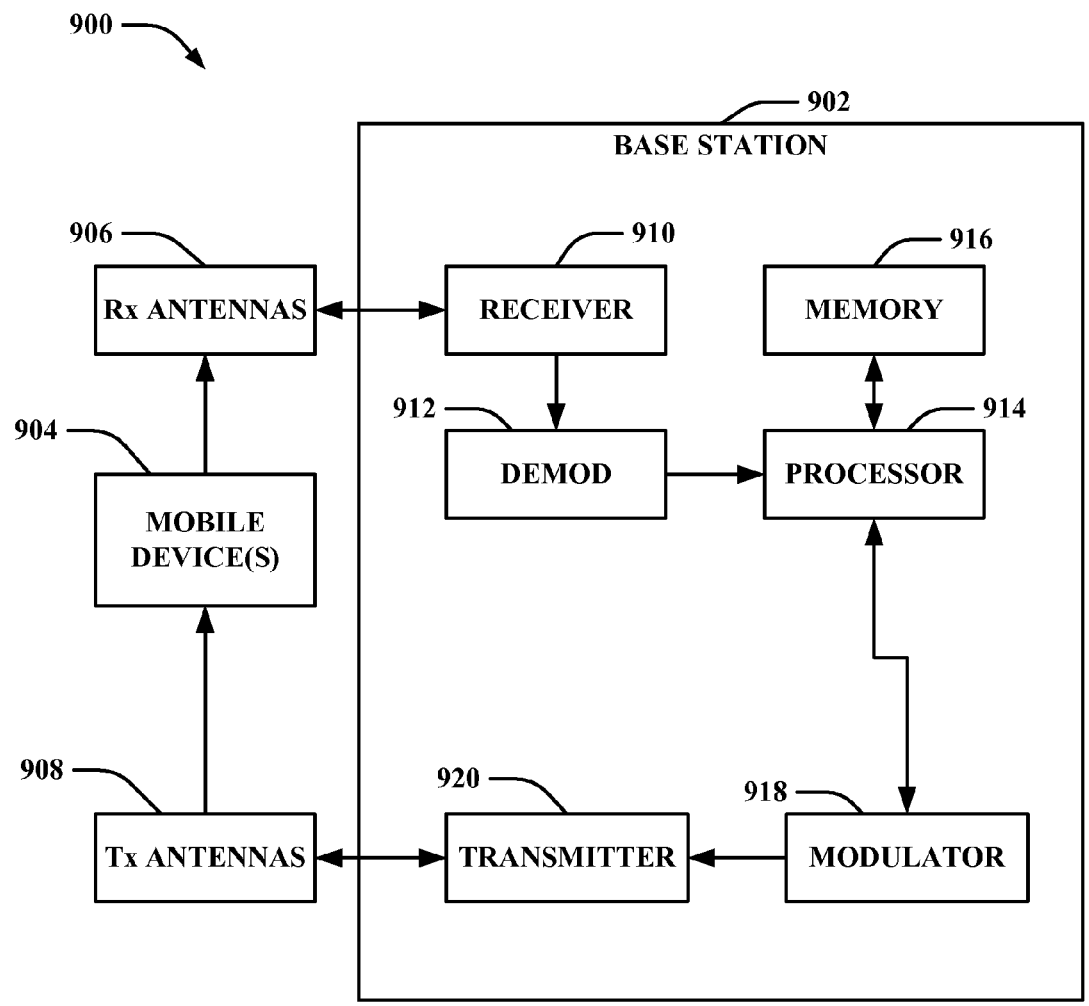
FIG. 9 is an illustration of an example system that facilitates wireless communications in accordance with an aspect of the subject disclosure.

FIG. 9 is an illustration of a system 900 that facilitates wireless communications in accordance with an aspect of the subject disclosure. The system 900 comprises a base station 902 (e.g., access point, . . . ) with a receiver 910 that receives signal(s) from one or more mobile devices 904 through a plurality of receive antennas 906, and a transmitter 920 that transmits information modulated by a modulator 918 to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 can be a processor dedicated to analyzing information received by receiver 910 and/or generating information for transmission by a transmitter 920, a processor that controls one or more components of base station 902, and/or a processor that both analyzes-information received by receiver 910, generates information for transmission by transmitter 920, and controls one or more components of base station 902.

Base station 902 can additionally comprise memory 916 that is operatively coupled to processor 914 and that can store data to be transmitted, received data, information related to available channels, data associated with analyzed signal and/or interference strength, information related to an assigned channel, power, rate, or the like, and any other suitable information for estimating a channel and communicating via the channel. Memory 916 can additionally store protocols and/or algorithms associated with estimating and/or utilizing a channel (e.g., performance based, capacity based, etc.).

It will be appreciated that the memory 916 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory. Furthermore, although depicted as being separate from the processor 914, it is to be appreciated that the scheduler, demodulator 912, and/or modulator 918 can be part of the processor 914 or multiple processors (not shown).

Figure 10:
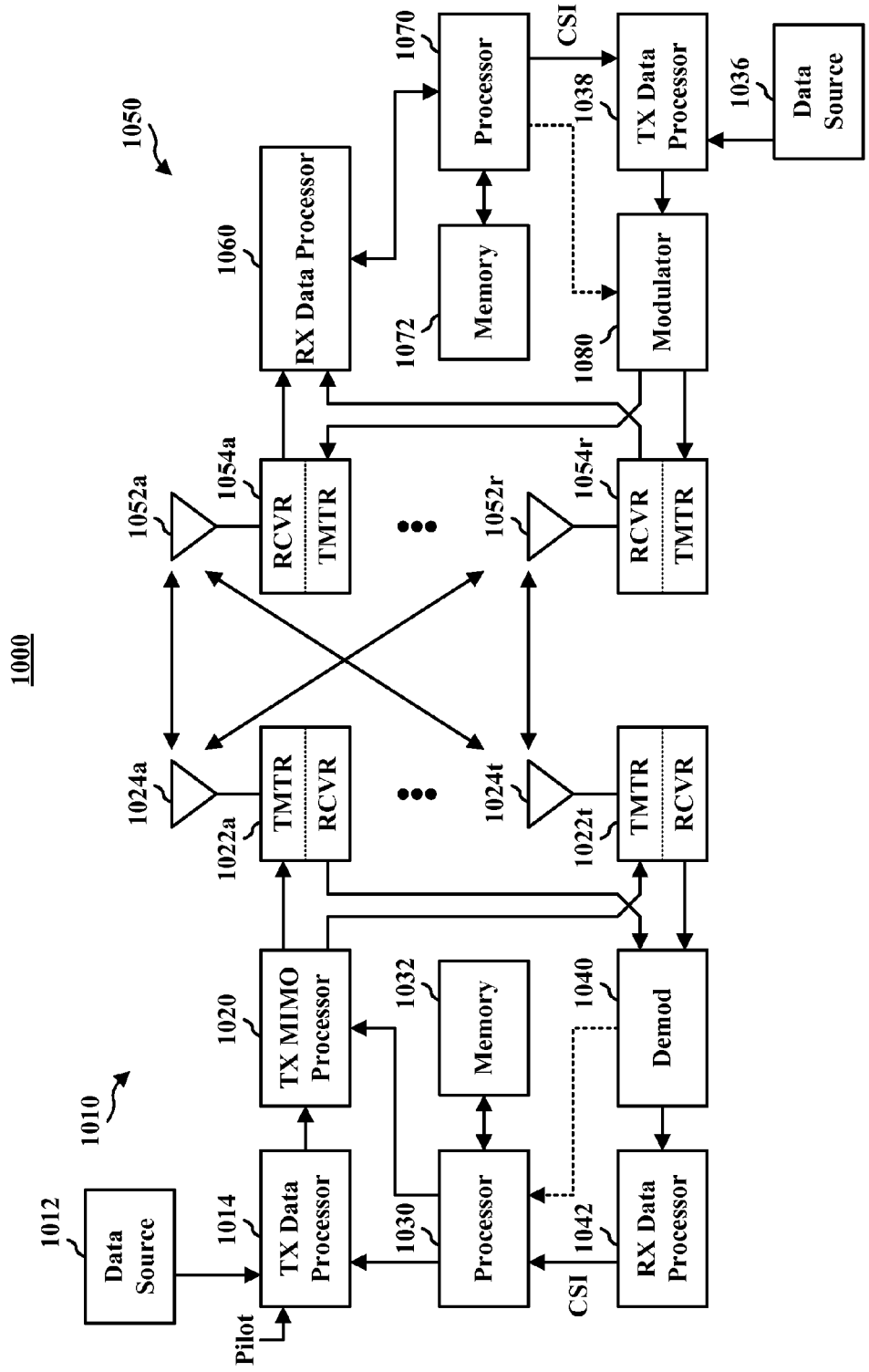
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-3 and 8-9), examples (FIGS. 4 and 5) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
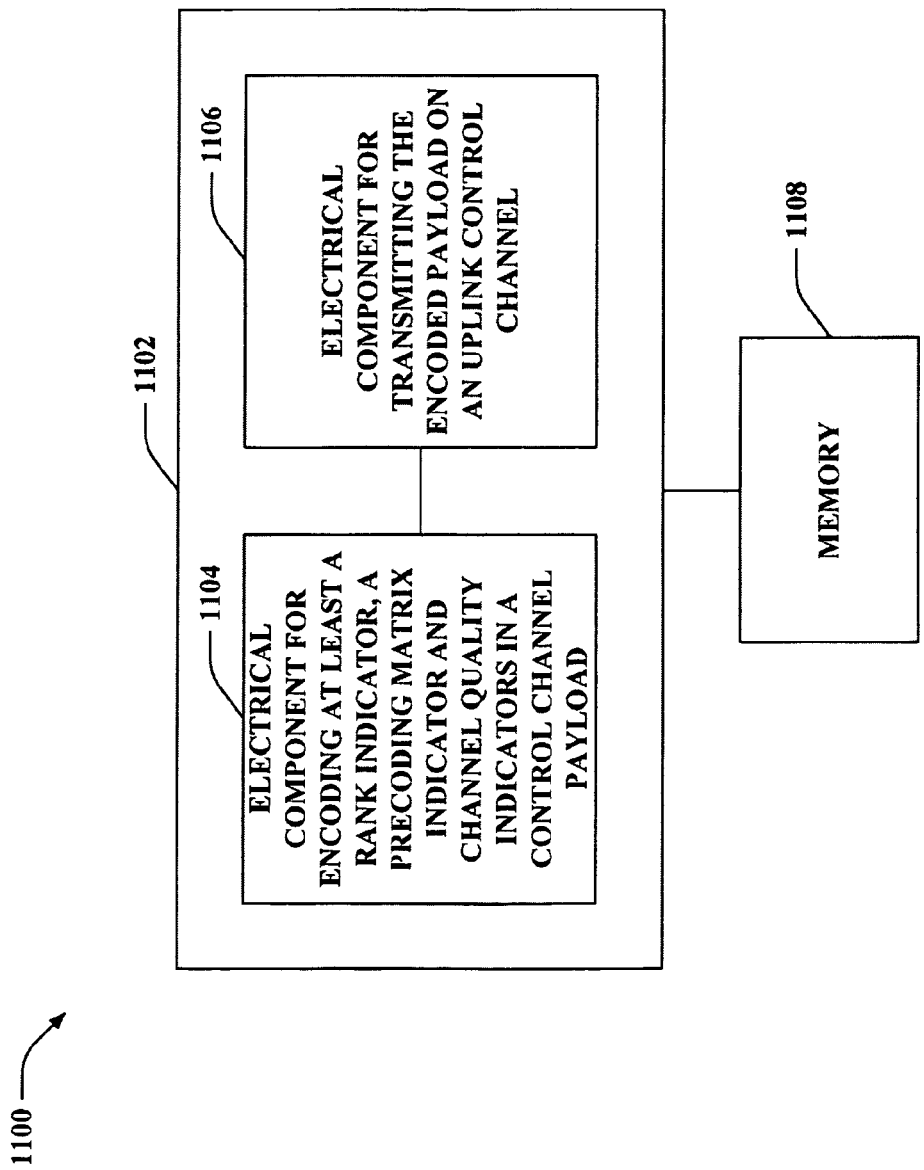
FIG. 11 is an illustration of an example system that facilitates generating control channel payloads that include feedback information.

With reference to FIG. 11, illustrated is a system 1100 that facilitates generating control channel payloads that include feedback information. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for encoding at least a rank indicator, a precoding matrix indicator and channel quality indicators in a control channel payload 104. Further, logical grouping 1102 can comprise an electrical component for transmitting the encoded payload on an uplink control channel 1106. Additionally, system 1100 can include a memory 1108 that retains instructions for executing functions associated with electrical components 1104, and 1106. While shown as being external to memory 1108, it is to be understood that one or more of electrical components 1104, and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates reporting information on an uplink control channel, comprising:
    encoding at least a rank indicator, a precoding matrix indicator, and channel quality indicators in a control channel payload in accordance with a payload format, the payload format includes a bit sequence that encodes at least the rank indicator jointly with a plurality of delta channel quality indicator levels within a common field of the bit sequence according to a differential channel quality indicator format; and
    transmitting the encoded control channel payload on the uplink control channel.

2. The method of claim 1, further comprising selecting the payload format in accordance with an antenna configuration.

3. The method of claim 1, further comprising establishing a channel quality indicator granularity.

4. The method of claim 3, further comprising selecting the payload format in accordance with the channel quality indicator granularity.

5. The method of claim 1, wherein the bit sequence further jointly encodes the precoding matrix indicator along with the rank indicator and the plurality of channel quality indicators.

6. The method of claim 1, wherein the payload format includes at most 5 bits that represent at most 32 levels of full channel quality indicators and at most 5 bits that represent at least 30 joint encoding sequences of the rank indicator, the precoding matrix indicator and 8 levels of delta channel quality indicators.

7. The method of claim 1, wherein the payload format includes at most 5 bits that represent at most 32 levels of full channel quality indicators, at most 3 bits that represent at least 8 joint encoding sequences of the rank indicator and 7 levels of delta channel quality indicators and at most 4 bits that represent one of 16 possible precoding matrix indicators.

8. The method of claim 1, wherein the payload format includes at most 5 bits that represent at most 32 levels of full channel quality indicators, at most 5 bits that represent at least 31 joint encoding sequences of the rank indicator and 10 levels of delta channel quality indicators and at most 4 bits that represent one of 16 possible precoding matrix indicators.

9. The method of claim 1, wherein the payload format includes at most 4 bits that represent at most 16 levels of full channel quality indicators and at most 4 bits that represent at least 15 joint encoding sequences of the rank indicator, the precoding matrix indicator and 3 levels of delta channel quality indicators.

10. The method of claim 1, wherein the payload format includes at most 4 bits that represent at most 16 levels of full channel quality indicators, at most 2 bits that represent at least 4 joint encoding sequences of the rank indicator and 3 levels of delta channel quality indicators and at most 4 bits that represent one of 16 possible precoding matrix indicators.

11. The method of claim 1, wherein the payload format includes at most 4 bits that represent at most 16 levels of full channel quality indicators, at most 4 bits that represent at least 16 joint encoding sequences of the rank indicator and 5 levels of delta channel quality indicators and at most 4 bits that represent one of 16 possible precoding matrix indicators.

12. The method of claim 1, wherein the uplink control channel is a physical uplink control channel.

13. The method of claim 1, further comprising encoding a hybrid automatic repeat request indicator in the control channel payload.

14. A wireless communications apparatus, comprising:
a memory that retains instructions related to encoding at least a rank indicator, a precoding matrix indicator and channel quality indicators in a control channel payload in accordance with a payload format, the payload format includes a bit sequence that encodes at least the rank indicator jointly with a plurality of delta channel quality indicator levels within a common field of the bit sequence according to a differential channel quality indicator format, and transmitting the encoded control channel payload on an uplink control channel; and
a processor, coupled to the memory, configured to execute the instructions retained in the memory.

15. The wireless communications apparatus of claim 14, the memory further retains instructions for selecting the payload format in accordance with an antenna configuration.

16. The wireless communications apparatus of claim 14, the memory further retains instructions for establishing a channel quality indicator granularity.

17. The wireless communications apparatus of claim 16, the memory further retains instructions for selecting the payload format in accordance with the channel quality indicator granularity.

18. The wireless communications apparatus of claim 14, wherein the bit sequence further jointly encodes the precoding matrix indicator along with the rank indicator and the plurality of channel quality indicators.

19. The wireless communications apparatus of claim 14, the memory further retains instructions for encoding a hybrid automatic repeat request indicator in the control channel payload.

20. A wireless communications apparatus that facilitates reporting information on an uplink control channel, comprising:

means for encoding at least a rank indicator, a precoding matrix indicator and channel quality indicators in a control channel payload in accordance with a payload format, the payload format includes a bit sequence that encodes at least the rank indicator jointly with a plurality of delta channel quality indicator levels within a common field of the bit sequence according to a differential channel quality indicator format; and
means for transmitting the encoded control channel payload on the uplink control channel.

21. The wireless communications apparatus of claim 20, further comprising means for selecting the payload format in accordance with an antenna configuration.

22. The wireless communications apparatus of claim 20, further comprising means for establishing a channel quality indicator granularity.

23. The wireless communications apparatus of claim 22, further comprising means for selecting the payload format in accordance with the channel quality indicator granularity.

24. The wireless communications apparatus of claim 20, wherein the bit sequence further jointly encodes the precoding matrix indicator along with the rank indicator and the plurality of channel quality indicators.

25. The wireless communications apparatus of claim 20, further comprising means for encoding a hybrid automatic repeat request indicator in the control channel payload.

26. A computer program product, comprising:
a non-transitory computer-readable medium comprising:
code for causing at least one computer to encode at least a rank indicator, a precoding matrix indicator and channel quality indicators in a control channel payload in accordance with a payload format, the payload format includes a bit sequence that encodes at least the rank indicator jointly with a plurality of delta channel quality indicator levels within a common field of the bit sequence according to a differential channel quality indicator format; and
code for causing the at least one computer to transmit the encoded control channel payload on an uplink control channel.

27. The computer program product of claim 26, in which the non-transitory computer-readable medium further comprises code for causing the at least one computer to select the payload format in accordance with an antenna configuration.

28. The computer program product of claim 26, in which the non-transitory computer-readable medium further comprises code for causing the at least one computer to establish a channel quality indicator granularity.

29. The computer program product of claim 28, in which the non-transitory computer-readable medium further comprises code for causing the at least one computer to select the payload format in accordance with the channel quality indicator granularity.

30. The computer program product of claim 26, wherein the bit sequence further jointly encodes the precoding matrix indicator along with the rank indicator and the plurality of channel quality indicators.

31. The computer program product of claim 26, wherein the payload format includes at most 5 bits that represent at most 32 levels of full channel quality indicators and at most 5 bits that represent at least 30 joint encoding sequences of the rank indicator, the precoding matrix indicator and 8 levels of delta channel quality indicators.

32. The computer program product of claim 26, wherein the payload format includes at most 5 bits that represent at most 32 levels of full channel quality indicators, at most 3 bits that represent at least 8 joint encoding sequences of the rank indicator and 7 levels of delta channel quality indicators and at most 4 bits that represent one of 16 possible precoding matrix indicators.

33. The computer program product of claim 26, wherein the payload format includes at most 5 bits that represent at most 32 levels of full channel quality indicators, at most 5 bits that represent at least 31 joint encoding sequences of the rank indicator and 10 levels of delta channel quality indicators and at most 4 bits that represent one of 16 possible precoding matrix indicators.

34. The computer program product of claim 26, wherein the payload format includes at most 4 bits that represent at most 16 levels of full channel quality indicators and at most 4 bits that represent at least 15 joint encoding sequences of the rank indicator, the precoding matrix indicator and 3 levels of delta channel quality indicators.

35. The computer program product of claim 26, wherein the payload format includes at most 4 bits that represent at most 16 levels of full channel quality indicators, at most 2 bits that represent at least 4 joint encoding sequences of the rank indicator and 3 levels of delta channel quality indicators and at most 4 bits that represent one of 16 possible precoding matrix indicators.

36. The computer program product of claim 26, wherein the payload format includes at most 4 bits that represent at most 16 levels of full channel quality indicators, at most 4 bits that represent at least 16 joint encoding sequences of the rank indicator and 5 levels of delta channel quality indicators and at most 4 bits that represent one of 16 possible precoding matrix indicators.

37. The computer program product of claim 26, wherein the uplink control channel is a physical uplink control channel.

38. The computer program product of claim 26, in which the non-transitory computer-readable medium further comprises code for causing the at least one computer to encode a hybrid automatic repeat request indicator in the control channel payload.

39. In a wireless communications system, an apparatus comprising:
a processor configured to:
encode at least a rank indicator, a precoding matrix indicator and channel quality indicators in a control channel payload in accordance with a payload format, the payload format includes a bit sequence that encodes at least the rank indicator jointly with a plurality of delta channel quality indicator levels within a common field of the bit sequence according to a differential channel quality indicator format; and
transmit the encoded control channel payload on an uplink control channel.

* * * * *